US005345316A

United States Patent [19]
Ozaki et al.

[11] Patent Number: 5,345,316
[45] Date of Patent: Sep. 6, 1994

[54] IMAGE DATA ENCODING/DECODING APPARATUS FOR CONCURRENT PROCESSING OF MULTIPLE IMAGE DATA STREAMS

[75] Inventors: Tohru Ozaki, Suginami; Hitoshi Horie, Ageo; Hideyuki Shirai, Ichikawa, all of Japan

[73] Assignee: Matsushita Graphic Communication Systems, Inc., Japan

[21] Appl. No.: 978,083

[22] Filed: Nov. 17, 1992

[30] Foreign Application Priority Data

Nov. 18, 1991 [JP] Japan .................... 3-301568

[51] Int. Cl.$^5$ .................... H04N 1/41; H04N 1/40
[52] U.S. Cl. .................... 358/426; 358/443; 358/462
[58] Field of Search ............ 358/426, 425, 404, 444, 358/462, 133, 539; 370/85.6, 112; 340/825.5, 825.51, 825.03; 307/243; 328/104, 154

[56] References Cited
U.S. PATENT DOCUMENTS
5,168,495 12/1992 Smith .................... 370/85.6

Primary Examiner—Edward L. Coles, Sr.
Assistant Examiner—Scott A. Rogers
Attorney, Agent, or Firm—Parkhurst, Wendel & Rossi

[57] ABSTRACT

An image data encoding/decoding apparatus having an encoder and decoder for processing image data such as facsimile data, in which two different streams of image data can be encoded concurrently by using a single encoding circuit section, and two different streams of encoded data can be decoded concurrently using a single decoding section. The encoded data obtained for each scan line portion of the image data are modified, if necessary, to be converted to an integral number of fixed-size amounts of data such as bytes, for subsequent storage in memory. During decoding processing, the encoded data line portions are restored to their respective original forms prior to decoding processing, by controlled operation of registers in which the encoded data are temporarily written in and then serially read out.

15 Claims, 10 Drawing Sheets

IMAGE DATA ENCODING/DECODING APPARATUS FOR CONCURRENT PROCESSING OF MULTIPLE IMAGE DATA STREAMS

BACKGROUND OF THE INVENTION

1. Field of the Invention

The present invention relates to an image data encoding/decoding apparatus for use in an image data communication apparatus such as a facsimile apparatus.

2. Description of the Related Art

In an image data communications apparatus such as a facsimile apparatus, image data are derived by successively scanning a document in successive scan lines, with the respectively corresponding sets of data obtained for the scan lines thereby being referred to in the following as image data line portions. Normally, each bit of the data represents a black or white picture element state. Before being transmitted to a distant facsimile apparatus, the amount of data that must be transmitted is reduced by encoding the image data, using a standard encoding format such as the MH, MR, or $MR^2$ format. The encoding may be one-dimensional (i.e. based on black/white transitions within each line) or two-dimensional. Two-dimensional coding includes a plurality of encoding modes, and is based on relationships between positions of transitions within a line and positions of transitions in the preceding (already encoded) line, which functions as a reference line. At the receiving facsimile apparatus, the encoded data are decoded to recover the original image data.

There is at present a requirement for types of facsimile apparatus which provide a high speed of processing and are capable of concurrent processing of respectively different streams of image data that are to be encoded, or streams of encoded data that are to be decoded to recover image data. With such a facsimile apparatus, image data and encoded data can be temporarily stored in memory. This enables a user, for example, to rapidly generate image data by scanning a document, without the need to wait for the system to execute transmission of the resultant image data during the scanning operation. In addition if concurrent processing is possible, then for example image data for respectively different documents can be read out from memory and encoded at the same time, to be stored in memory and subsequently transmitted, or encoded data for different documents can be decoded at the same time, and the results stored in memory to be subsequently sent to a printer.

Figure 1:
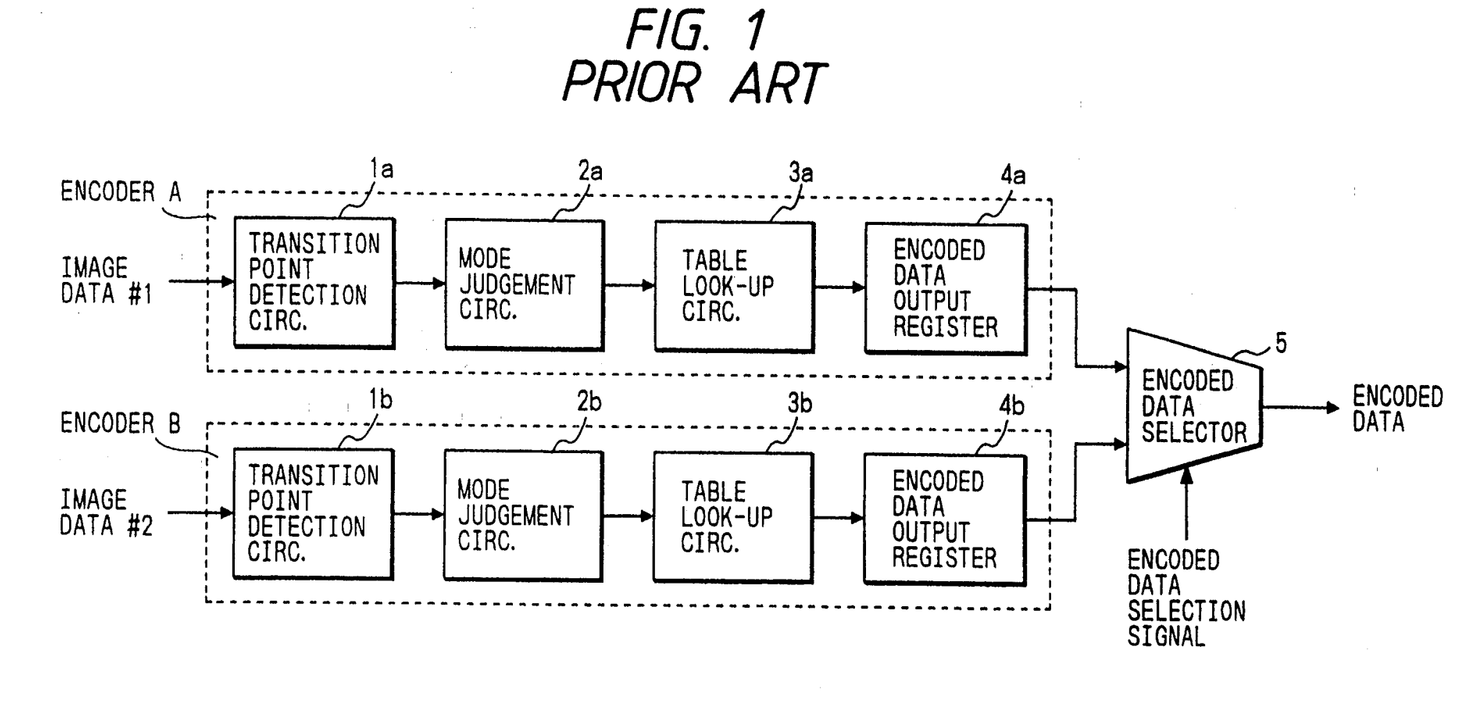
FIG. 1 is a general block diagram of an encoder of a prior art type of image data encoding/decoding apparatus capable of encoding two parallel streams of image data.
Figure 2:
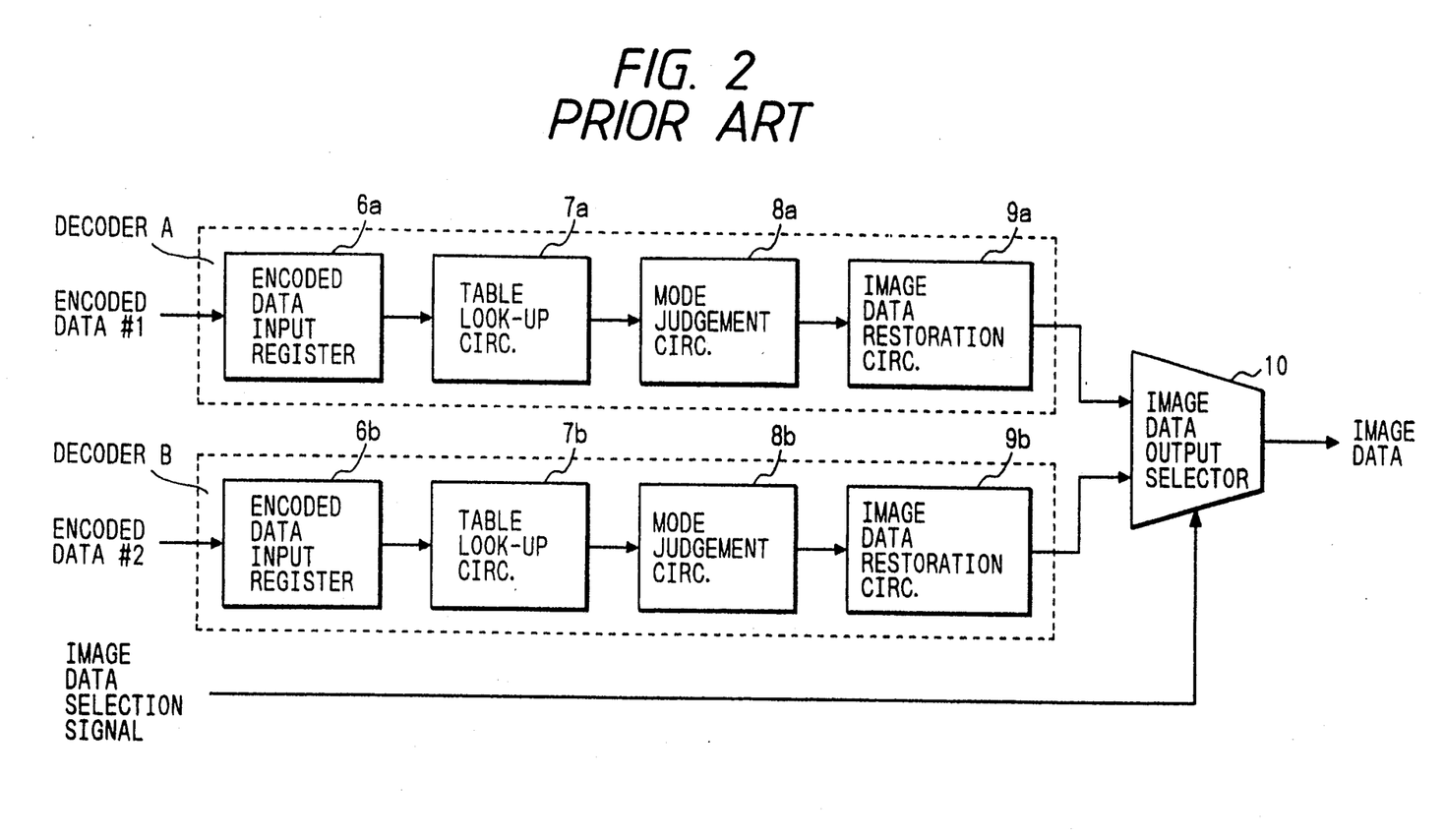
FIG. 2 is a general block diagram of a decoder in the apparatus of FIG. 1.

FIGS. 1 and 2 show respective prior art examples of arrangements for concurrent encoding of two different streams of image data, and for decoding two different streams of encoded data. In FIG. 1, an encoder A receives an input data stream designated as image data #1, as a serial bit stream, while an encoder B similarly receives an input data stream designated as image data #2. As shown, the encoders A and B are formed of transition point detection circuits 1a, 2b respectively, which receive as inputs the image data #1 and image data #2 respectively, mode judgement circuits 2a, 2b which receive outputs from the transition point detection circuits 1a, 1b respectively, table look-up circuits 3a, 3b which receive outputs from the mode judgement circuits 2a, 2b, and encoded data output registers 4a, 4b which receive outputs from the table look-up circuits 3a, 3b. The respective outputs from the encoded data output registers 4a, 4b are supplied to an encoded data output selector 5, which is controlled by an encoded data selection signal to periodically select one of these outputs to be transferred, e.g. to be stored in memory. In the encoder A, the transition point detection circuit 1a detects transitions between the black/white states in the image data #1, the mode judgement circuit a judges the encoding modes which are applicable, and based on the modes and the detected positions of transitions, corresponding code values are obtained from the table look-up circuit 3a and temporarily held in the encoded data output register 4a. The image data #2 is similarly encoded by the encoder B.

In FIG. 2, the decoders A and B are respectively formed of encoded data input registers 6a, 6b which receive the streams of encoded data #1 and encoded data #2, while outputs from the encoded data input registers 6a, 6b are supplied to table look-up circuits 7a, 7b respectively, outputs from the table look-up circuits 7a, 7b are supplied to respective mode judgement circuits 8a, 8b, and outputs from the mode judgement circuits 8a, 8b are supplied to respective image data restoration circuits 9a, 9b. In the decoder A, the encoded data are temporarily held in the encoded data input register 6a, and the original image data are recovered by the image data restoration circuit based on results obtained from the table look-up circuit 7a and mode judgement circuit 8a. The encoded data #2 are similarly processed by the decoder B. Output image data from the decoder A or decoder B are selected by the image data output selector 10, e.g. to be transferred to a memory.

However such a prior art type of image data encoding/decoding apparatus has the basic disadvantage that it is necessary to provide two complete encoder circuits and two complete decoder circuits in order to achieve concurrent encoding or concurrent decoding of separate streams of image data or encoded data. Thus, the overall system scale of a facsimile apparatus using such an image data encoding/decoding apparatus will be increased by comparison with a facsimile apparatus which does not have such a concurrent encoding/decoding capability.

SUMMARY OF THE INVENTION

It is an objective of the present invention to provide an image data encoding/decoding apparatus for use in an image data communications apparatus such as a facsimile apparatus, whereby a single encoder circuit and single decoder circuit can concurrently encode a plurality of streams of image data and concurrently decode a plurality of streams of encoded data, or can selective encode a plurality of streams of image data with priority being assigned to encoding a specific one of the streams, and selective decode a plurality of streams of encoded data with priority being assigned to decoding a specific one of the streams.

To achieve the above objective, the present invention provides an image data encoding/decoding apparatus having an encoder comprising:

first selector means receiving respectively different streams of image data as inputs, for selectively transferring image data from the streams;

detection means for detecting transition points in the image data selected by the first selector means;

encoding means for encoding the image data in accordance with transition points detected in the image data;

memory means for storing respective encoded data derived by the encoding means from the different streams;

second selector means for selectively transferring respective encoded data of the input image data streams, produced from the memory means; and selector control means for controlling respective operations of the first and second selector means.

With such an image data encoding/decoding apparatus, the respectively different streams of image data may comprise image data which have been read by a scanner and are to be subsequently transmitted, and image data which have been previously received by the image data encoding/decoding apparatus and decoded and stored in a memory.

The selector control means preferably controls the first selector means to selectively transfer successively alternating lines of the different streams of image data.

Moreover in the encoder of such an apparatus, the memory means preferably operates on each of respective encoded data streams derived from the image data streams to alternately store and read out the encoded data as fixedly predetermined amounts of data such as units of bytes, the encoded data amounts thus read out being successively supplied to the selector means, with the encoder further comprising respective position storage means for each of the streams of image data, each of the position storage means functioning, when a final portion of a line of encoded data derived from an image data stream corresponding to the position storage means does not attain the fixedly predetermined amount of data, to derive and store a value representing a position of a final bit of the final portion, the final portion being thereafter held stored in the memory means until encoding of a succeeding line of the image data stream begins.

The memory means of such an encoder may comprise a plurality of memories, identical in number to a number of the image data streams, each memory functioning to temporarily store encoded data of a corresponding one of the image data streams.

The invention further provides in an image data encoding/decoding apparatus, an encoder comprising:

first selector means receiving respectively different streams of image data as inputs, for selectively transferring image data from the streams;

detection means for detecting transition points in the image data selected by the first selector means;

encoding means for encoding the image data in accordance with transition points detected in the image data;

a plurality of memories respectively corresponding to the different streams of input data, each memory functioning to temporarily store encoded data derived by the encoding means from a corresponding one of the image data streams;

second selector means for selecting and outputting respective encoded data of the input image data streams, produced from the memory means; and selector control means for controlling operations of the the second first and second selector means to assign priority to encoding of a specific one of the streams of image data, by temporarily interrupting selection of another one of the streams of image data when encoding of the specific one of the streams is required.

The invention further provides an image data encoding/decoding apparatus having a decoder comprising:

memory means for receiving two respectively different streams of encoded data, and for storing the encoded data of the respective streams;

selector means for receiving encoded data produced from the memory means, and for selectively transferring encoded data of the respective streams;

decoding means for decoding the encoded data selected by the selector means; and selector control means for controlling operation of the selector means.

In such an apparatus, the different streams of encoded data may respectively comprise encoded data which have been received by the image data encoding/decoding apparatus and are to be transferred to a printer after decoding, and encoded data which have been read out from an encoded data memory and are to be changed to a different code format and to be then stored in an encoded data memory.

With such a decoder, the selector means preferably functions to select successively alternating lines of the respectively different streams of encoded data.

The memory means operates on each of the encoded data streams to alternately store and read out the encoded data stream as fixedly predetermined amounts of data such as bytes, the encoded data amounts thus read out being successively supplied to the second selector means, with the encoder further comprising respective position storage means for each of the streams of encoded data, each of the position storage means having set therein respective positions of final bits of lines of the each stream of encoded data, the memory means being controlled in accordance with the contents of the position storage means to halt outputting of encoded data of a corresponding one of the encoded data streams each time that a position corresponding to a final bit of a line of the stream is reached, and to subsequently resume outputting of encoded data stored therein at commencement of receiving encoded data of a succeeding line of the encoded data stream.

DESCRIPTION OF PREFERRED EMBODIMENTS

Figure 3:
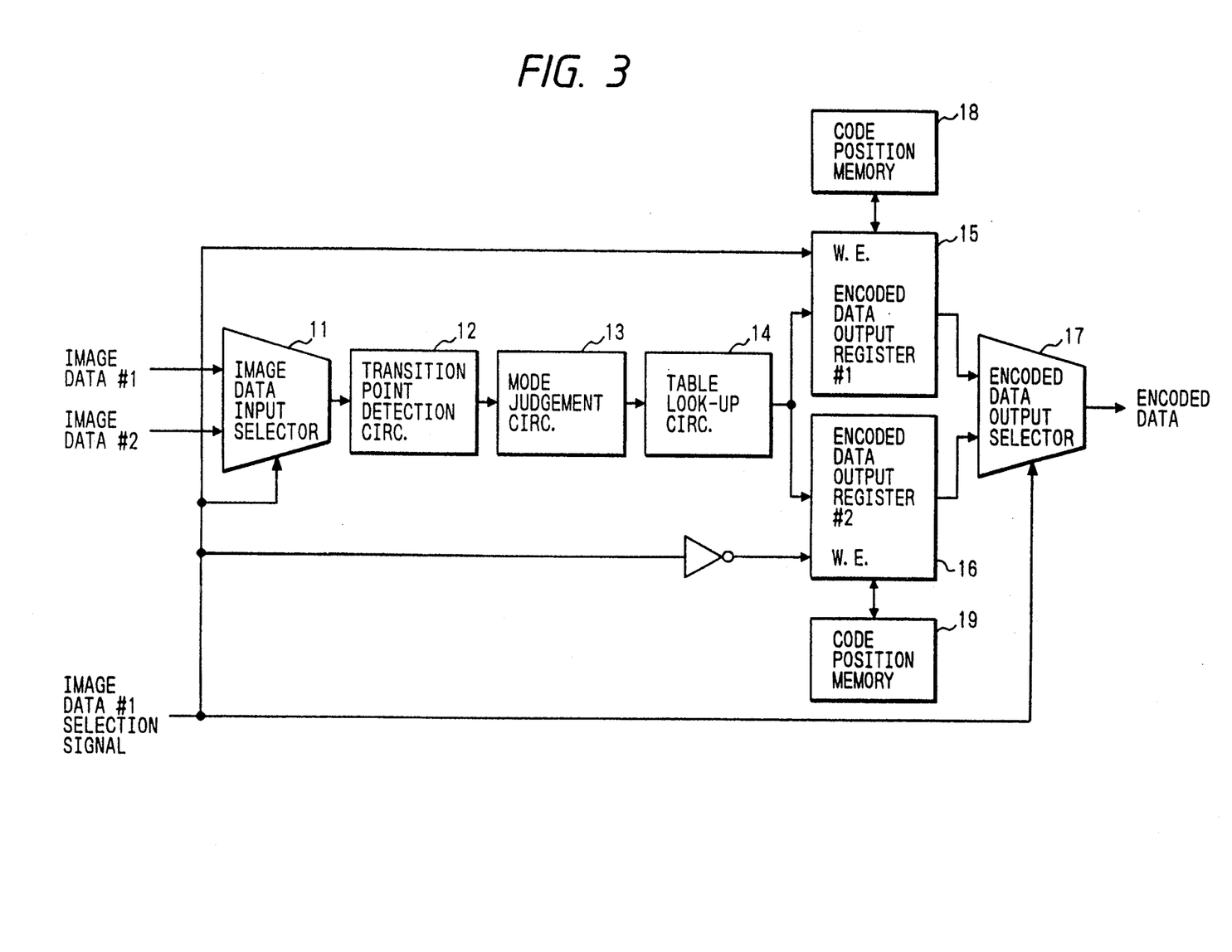
FIG. 3 is a general block diagram of an embodiment of an encoder of an image data encoding/decoding apparatus according to the present invention.

An embodiment of an encoder circuit for use in an image data encoding/decoding apparatus according to the present invention will be described referring first to the circuit block diagram of FIG. 3. In FIG. 3, two different streams of serial image data, image data #1 and image data #2 are supplied (i.e. as image data derived for successive scan lines, as described hereinabove) to respective inputs of an image data input selector 11. The intervals of lines of the image data #1 alternate with those of the image data #2, and a selection signal referred to in the following as the image data #1 selection signal controls the image data input selector 11 to transfer the successive line portions of image data #1 and image data #2. The selected image data from the image data input selector 11 are supplied to a transition point detection circuit 12, whose output is connected to a mode judgement circuit 13. Black/white transitions represented in the selected data stream are detected by the transition point detection circuit 12, and based on the judgement results obtained from the mode judgement circuit 13 and on the positions of detected transitions, the table look-up circuit 14 derives corresponding code values for the image data stream. The encoded data from the table look-up circuit 14 are temporarily written into an encoded data #1 output register 15 or an encoded data #2 output register 16, in accordance with the state of the image data #1 selection signal, which is applied directly to a "write enable" control input of the encoded data #1 output register 15 and is inverted and applied to the "write enable" control input of the encoded data #2 output register 16. The position of the final bit of the encoded data derived for each line of the image data #1 (i.e. with respect to the initial bit of the encoded data obtained for the line) is detected by and stored in a code position memory 18, as a position value for that line, while similarly the position of the final bit of the encoded data derived for each line of the image data #2 is stored in a code position memory 19. Encoded data are read out from the encoded data #1 output register 15 and encoded data #2 output register 16 in units of a fixed number of bits, which will be assumed to be 8 bits (i.e. byte units) in the following, as described hereinafter.

The input data streams, image data #1 and image data #2, are read out from a memory (not shown in the drawings) in which the data were previously stored, and might for example respectively consist of image data which were locally generated by scanning a document and then stored in memory, and image data previously derived by decoding encoded data within the local facsimile apparatus and then stored in memory, and which are being supplied to the encoder in order to re-encode the data using a different format (e.g. to change from EF to ER code). Input data #1 and image data #2 are supplied in mutually alternating line intervals, as will be described referring to the timing diagram of FIG. 6 which illustrates the operation of the encoder of FIG. 3. Two successive line portions of image data #1 are designated as $I1_1$ and $I1_2$, while a line portion of image data #2 which occurs between $I1_1$ and $I1_2$ is designated as $I2_1$. As shown, the lines of image data #1 are selected by the image data input selector 11 when the the image data #1 selection signal is at the "1" logic level, and lines of image data #2 are selected when that control signal is at the "0" level. It will be understood that although the circuit of FIG. 3 is represented as formed of separate hardware circuit blocks in order to provide a clear understanding of the principles of operation, in a practical apparatus the functions of blocks such as the image data input selector 11 for example could be implemented by software control.

It should also be understood that the function performed by the input selector 12 is to selectively transfer image data of the two input streams, and that in a practical system, the input selector 11 function would for example be implemented by controlling the memory in which the input data are stored, such as to read out one line of image data #1 onto a data bus which is connected to the detection circuit 12, then read out one line of image data #2 onto that bus, and so on in alternating line intervals. Similarly, the function of the output selector 17 could be implemented by connecting the outputs from the registers 15, 16 to a data bus which is connected to a memory, and controlling write-in operations of that memory in accordance with read-out operations of the registers 16, 17.

The image data #1 selection signal controls the encoded data output registers 15 and 16 such that while data are being outputted from the table look-up circuit 14 and the image data #1 selection signal is at the "1" level, the data are written into the encoded data #1 output register 15 while serial read-out of previously written data from the encoded data #1 output register 15 is enabled, whereas if the image data #1 selection signal is at the "0" level the data are written into the encoded data #2 output register 16 while write-in and serial read-out of previously written data is enabled for the encoded data #2 output register 16.

Figure 6:
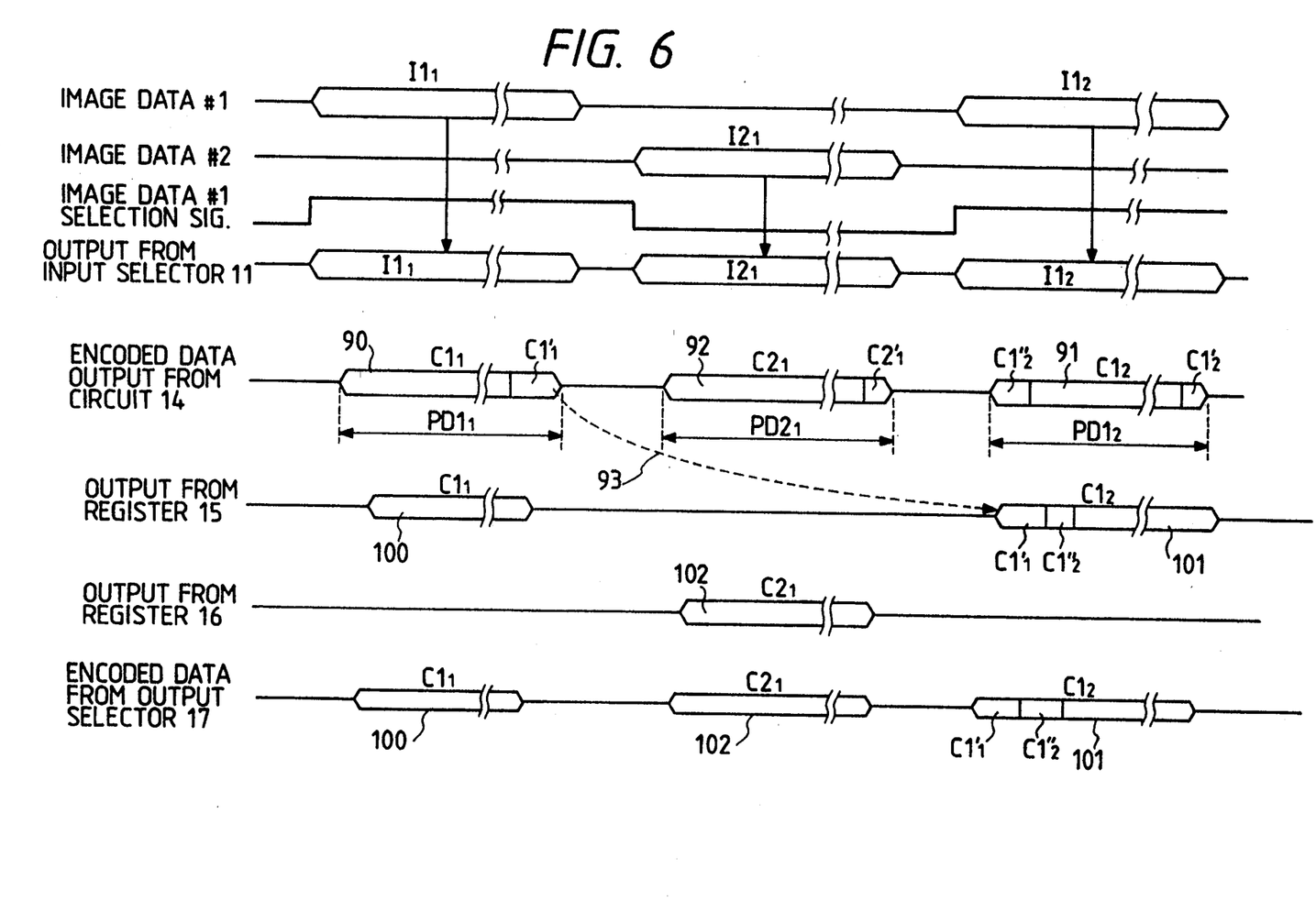
FIGS. 6 and 7 are timing diagrams for describing the operation of the encoder of FIG. 3.

When an image data line portion is encoded, the resultant encoded data will consist of an arbitrary number of serial bits which in general will not be an integral number of data units such as 8-bit bytes. However this embodiment produces, in response to each input image data line portion, a corresponding set of encoded data bits which is an integral number of data units, which will be assumed to be 8-bit bytes. This is achieved by dividing each encoded data line portion into successive byte-units, and removing a final sub-portion of bytes from an encoded data line portion if that final sub-portion consists of less than 8 bytes. The final sub-portion thus removed is subsequently attached at the head of the encoded data portion for the succeeding line, which is then similarly modified if necessary to be converted to an integral number of bytes. The process will be described referring to the timing diagrams of FIGS. 6 and 7. Two successive line portions of image data #1 are designated as $I1_1$ and $I1_2$ respectively, while a line portion of image data #2 which is generated between $I1_1$ and $I1_2$ is designated as $I2_1$. These three image data line portions $I1_1$, $I2_1$ and $I1_2$ are outputted sequentially from the image data input selector 11 as shown in FIG. 6. The respective resultant encoded data line portions, and modified versions of these which arise as described hereinafter, are indicated throughout the drawings as $C1_1$, $C2_1$ and $C1_2$. However the original unmodified verisions of these encoded data line portions are designated by numerals 90, 92 and 91 respectively, to avoid confusion. It will be assumed for the purpose of description that each of the originally encoded data line portions $C1_1$ and $C2_1$ consists of a non-integral number of byte units. While the image data $I1_1$ is being encoded, the resultant encoded data $C1_1$ is outputted from the table look-up circuit 14 as serial bits, which are written into the encoded data #1 output register 15. As these bits are being written in they are counted, from the start of $C1_1$, until the final bit of $C1_1$ is detected. The total number of bits of $C1_1$ (i.e. of the portion 90) is then stored in the code position memory 18 as a position value (designated as $PD1_1$) which indicates the position of the final bit of $C1_1$ with respect to the start of $C1_1$. The line $I2_1$ of image data #2 is then similarly encoded while the image data #1 selection signal is at the "0" level, and a position value ((designated as $PD2_1$) which indicates the position of the final bit of $C2_1$ with respect to the start of $C2_1$ (i.e. the start of the portion 92) is stored in the code position memory 19. The operation is then repeated for the line $I1_2$ of image data #1.

It can thus be understood that the system shown in FIG. 3 includes a detection function for detecting the last bit of the encoded data derived for an image data line, in addition to the memory function of the code position memories 18, 19. In each encoded data line portion that is derived for each image data line portion, an "EOL" (End of Line) code is inserted to indicate the end of the scan line data, and the final bit of the encoded data for a line might for example be detected based on that EOL code. The operation of circuits 18, 19 is controlled by a microcomputer which controls the overall operation of the embodiment, executing functions such as the aforementioned detection function, and accordingly determining the state of the image data #1 selection signal.

Figure 4:
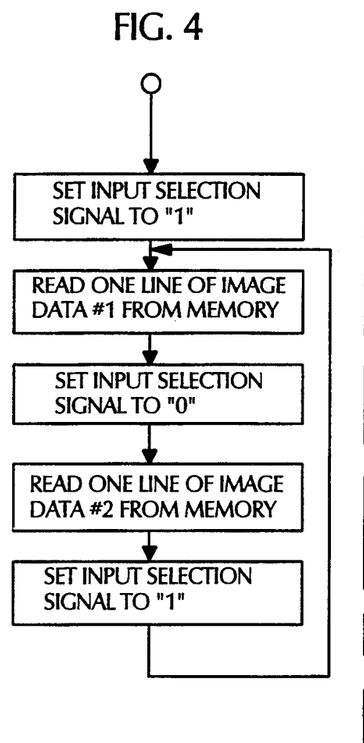
FIGS. 4 and 5 are flow diagrams for describing control of the operation of the encoder of FIG. 3.
Figure 5:
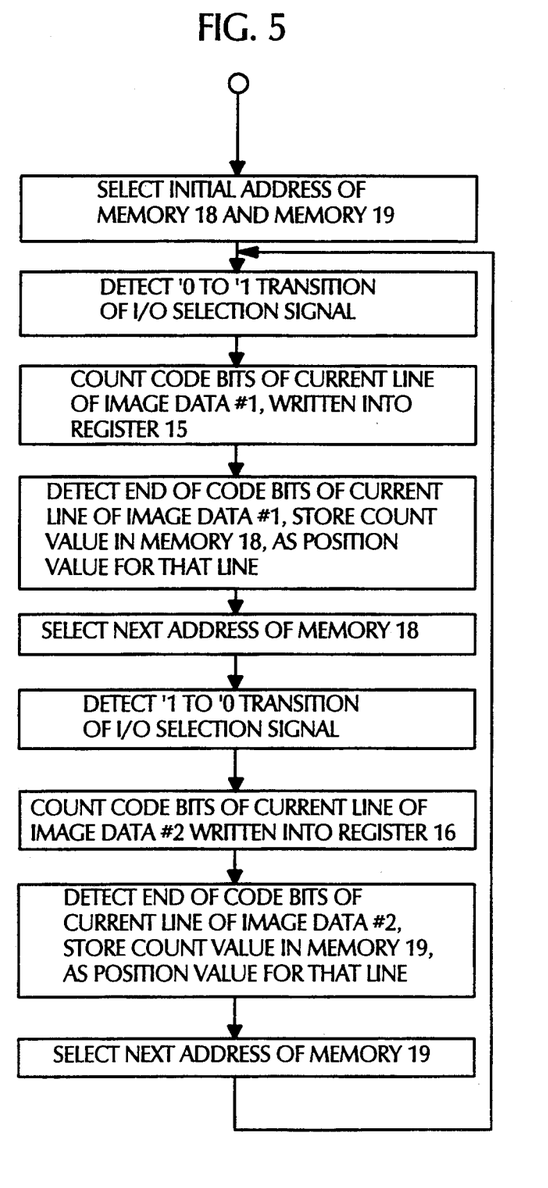

An example of a basic software routine for generating the image data #1 selection signal is shown in FIG. 4, and a routine for controlling the circuits 18, 19 is shown in FIG. 5. As a result of this operation, respective position values are stored in the code position memories 18, 19 corresponding to the encoded data which are generated for successive image data lines. The position values $PD1_1$ and $PD2_1$ shown in FIG. 6 for example would be written into respective initial addresses of the code position memories 18 and 19 respectively.

As encoded data for a line are serially written into one of the encoded data output registers 15 or 16, each time that the number of bits written into the register reaches a total of 8, the contents of the register are outputted through the encoded data output selector 17. Each byte thus produced can for example be outputted from the register in parallel 8-bit form, to be transferred from the encoded data output selector 17 via a standard data bus to a memory, and stored therein. If the number of bits in the encoded data obtained for a line is not an integral number of bytes, then a final part of the encoded data will be retained in that output register until the start of encoded data for the succeeding line. Various specific arrangements for each of the encoded data output registers #1 and #2 could be envisaged. For example, an 8-bit shift register could successively receive the serial bits produced from the table look-up circuit 14, with the shift register contents being latched into a parallel register each time that 8 bits have been shifted in. The encoded data could thereby be obtained from the parallel register in successive parallel byte units. Since various arrangements could be envisaged for implementing these output registers, detailed description is omitted.

Figure 7:
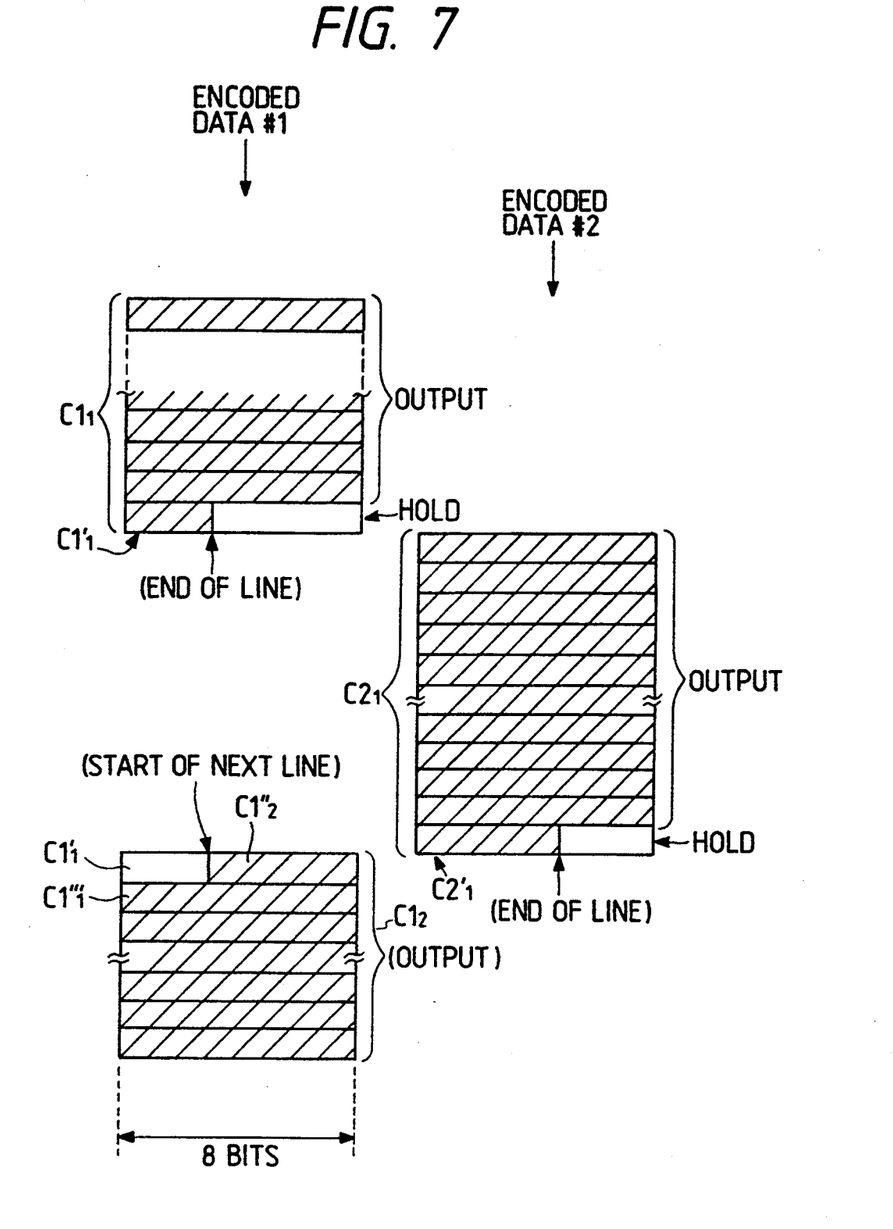

FIG. 7 illustrates the operation of the output registers 15, 16 for the encoded data $C1_1$, $C2_1$ which are generated for the image data lines $I1_1$ and $I2_1$ of FIG. 6, and written into registers 15 and 16 respectively. Successive 8-bit bytes written into each register are shown as vertically successive horizontal bars. As indicated, successive byte units of $C1_1$ are outputted sequentially from the encoded data #1 output register 15, until the final part of $C1_1$ is reached, which is assumed to consist of less than 8 bits, e.g. 3 bits. That final portion is indicated as $C1_1'$ in FIGS. 6 and 7. At that point (i.e. when the final bit of the encoded data line portion 90 is detected) the image data #1 selection signal is set to the "0" level, and the encoded data $C2_1$ are then similarly written into the encoded data #2 output register 16, with successive bytes being outputted and a final non-integral portion designated as $C2_1'$ being left held in the encoded data #2 output register 16 when the end of that encoded data line portion (92) is reached and the image data #1 selection signal is returned to the "1" level.

The encoded data $C1_2$ for the next line ($I1_2$) of image data #1 then begins to be written into the encoded data #1 output register 15. When an initial number of bits of that encoded data (designated as the sub-portion $C1_2''$) has been written which is sufficient to form a total of 8 bits in conjunction with the final bits ($C1_1'$) from the encoded data of the preceding line, that byte (i.e. a combination of the sub-portions $C1_1'$ and $C1_2''$) is transferred out from the encoded data #1 output register 15 to the encoded data output selector 17. For example if $C1_1'$ consists of 3 bits, then $C1_2''$ would consist of 5 bits. The process described above then continues for the remaining bits of the encoded data $C1_2$. It can thus be understood that in the output data flow from the encoded data output selector 17, as illustrated in FIG. 6, the final set of bits ($C1_1'$) of the encoded data $C1_1$ which is less than one byte has been transferred to the head of the encoded data ($C1_2$) for the succeeding line of image data #1, as indicated by the arrow line 93. Thus a modified version of the line portion $C1_1$, designated by numeral 100 in FIG. 6, is actually outputted from the encoded data output selector 17. In addition, the position of the final bit of the original encoded data line portion $C1_1$ (with respect to the head of $C1_1$) has been stored in the code position memory 18 as the value $PD1_1$.

The encoded data obtained for each of the lines of image data #1 and image data #2 are similarly processed, with a final portion of the encoded data for a line being transferred to the head of the encoded data for the succeeding line whenever the encoded data (in conjunction with any additional leading bits transferred from the encoded data for the preceding line) consists of a non-integral number of byte units.

The encoded data thus transferred out of the encoded data output selector 17 are stored in memory until required, e.g. with the encoded data for image data #1 (designated in the following as encoded data #1) and the encoded data for image data #2 (designated in the following as encoded data #2) being allocated to respectively different sets of addresses in the memory. The encoder of the above embodiment has been described for the case in which two different streams of image data are encoded concurrently, by being supplied as respectively alternating lines of data. With another encoder embodiment according to the present invention however, only one stream of data is processed at a time. In that case, the successive lines of each data stream would be processed for encoding in the same way as has been described for the embodiment described above.

In that case, assuming for example that the image data #1 selection signal is currently controlling the input selector 11 to continuously transfer the image data #1 stream to the detection circuit 12 and controlling the output selector 17 to transfer the bytes of encoded data #1 from the output register 15, and if it is assumed that the image data #2 stream has been assigned priority for encoding, then the control system which generates the image data #1 selection signal operates such that, whenever it becomes necessary to encode image data #2, the image data #1 selection signal controls the image data input selector 11 such as to interupt transfer of the image data #1 stream to the transition point detection circuit 12, and to continously transfer the image data #2 stream to the detection circuit 12. At the same time, the encoded data output selector 17 is controlled to transfer the successive bytes of encoded data #2 from the output register 16. After a specific amount of the image data #2 (for example, one page) has been encoded, then the image data #1 selection signal is set to the state whereby the image data #1 stream again is continuously transferred by the image data input selector 11 to the detection circuit 12.

It will be apparent that the configuration and operation of such an embodiment can be similar to those of the embodiment described above for concurrent encoding of image data #1 and image data #2, so that further description of an embodiment for priority encoding operation will be omitted.

Figure 8:
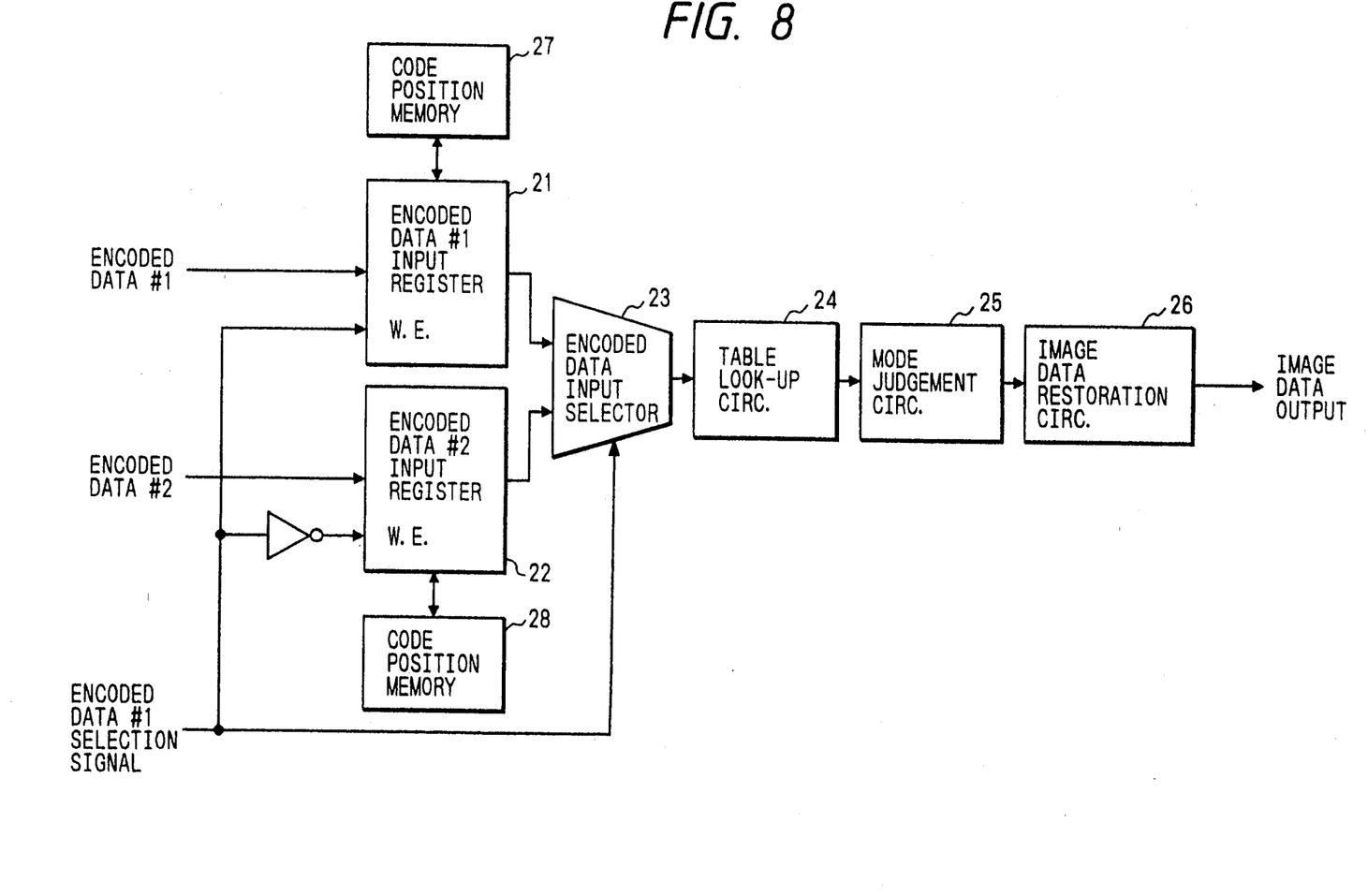
FIG. 8 is a general block diagram of an embodiment of a decoder of an image data encoding/decoding apparatus according to the present invention.
Figure 9:
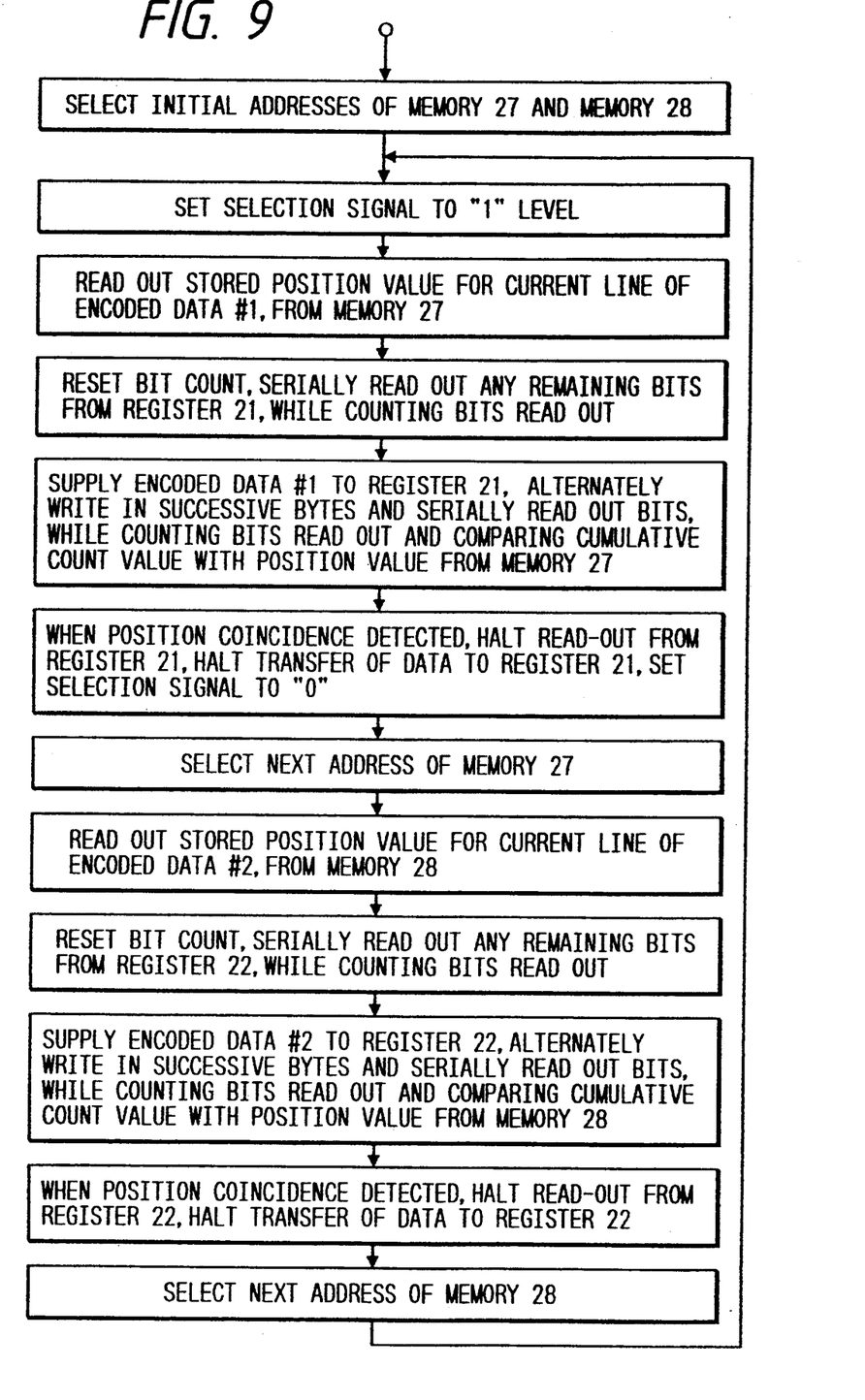
FIG. 9 is a flow diagram for describing control of the operation of the decoder of FIG. 8.

FIG. 8 is a circuit block diagram of a decoder embodiment for an image data encoding/decoding apparatus according to the present invention. It will be assumed for the purpose of description that the aforementioned encoded data #1 and encoded data #2 are read out of memory and respectively inputted to encoded data input registers 21 and 22 respectively. Overall control of the operation of each of the registers 21 and 22 and of two code position memories 27 and 28 is performed by microcomputer, as for the encoder of FIG. 3 described above. FIG. 9 is a flow diagram showing the basic overall control operation for the code position memories 27, 28 and the encoded data input registers 21, 22. Data write-in to the registers 21, 22 is controlled by the encoded data #1 selection signal, which also controls an encoded data input selector 23 which receives respective outputs from the registers 21, 22. Data selected by the encoded data input selector 23 are supplied to a table look-up circuit 24 which functions in conjunction with a mode judgement circuit 25 and image data restoration circuit 26 to recover, from the encoded data for a line, the original image data of that line.

For simplicity of description, an input selector for transferring the encoded data #1 and #2 to the input registers 21 and 22 has been omitted from the drawing. As for the encoder embodiment described above, the functions of such an input selector can in practice be implemented by control of memory read-out operations. Prior to decoding, the encoded data #1 and #2 are stored in the aforementioned memory (not shown in the drawing), e.g. the memory in which the encoded data produced from the encoder of FIG. 3 were stored. During decoding, lines of encoded data #1 and #2 are read out and transferred to the input registers 21 and 22 respectively, in alternating line intervals.

The operation of the circuit of FIG. 8 will be described referring to the timing diagrams of FIGS. 10 and 11, in which it is assumed for ease of understanding that the encoded data $C1_1$, $C2_1$ and $C1_2$ obtained for the image data lines $I1_1$, $I2_1$ and $I1_2$ as described above referring to FIGS. 6 and 7, are to be decoded to recover the original image data, and in which data portions corresponding to data portions shown in FIG. 6 are indicated by identical reference numerals. Prior to the start of decoding operation, the position values for the encoded data #1 and encoded data #2 which had been written into the code position memories 18, 19 of FIG. 3 are respectively set into the code position memories 27, 28 in FIG. 8, and initial addresses of these code position memories 27, 28 are selected for read-out of position values. That is to say, the position values $PD1_1$ and $PD2_1$ indicated in FIG. 6, for the first line portions of encoded data #1 and encoded data #2 respectively, are initially read out from the code position memories 27, 28 respectively.

While the encoded data #1 selection signal is at the "1" level, successive bits of the encoded data #1 are read out from memory and each supplied to the encoded data #1 input register 21, to be written therein in successive units of bytes. When a byte has been written in, it is then read out serially from the encoded data #1 input register 21 to be transferred through the encoded data input selector 23. The original image data is then recovered by the operation of the table look-up circuit 24, mode judgement circuit 25 and image data restoration circuit 26. When the encoded data #1 selection signal is at the "0" level, similar operation is executed for the encoded data #2 input register 22, operation on the encoded data #2.

Figure 10:
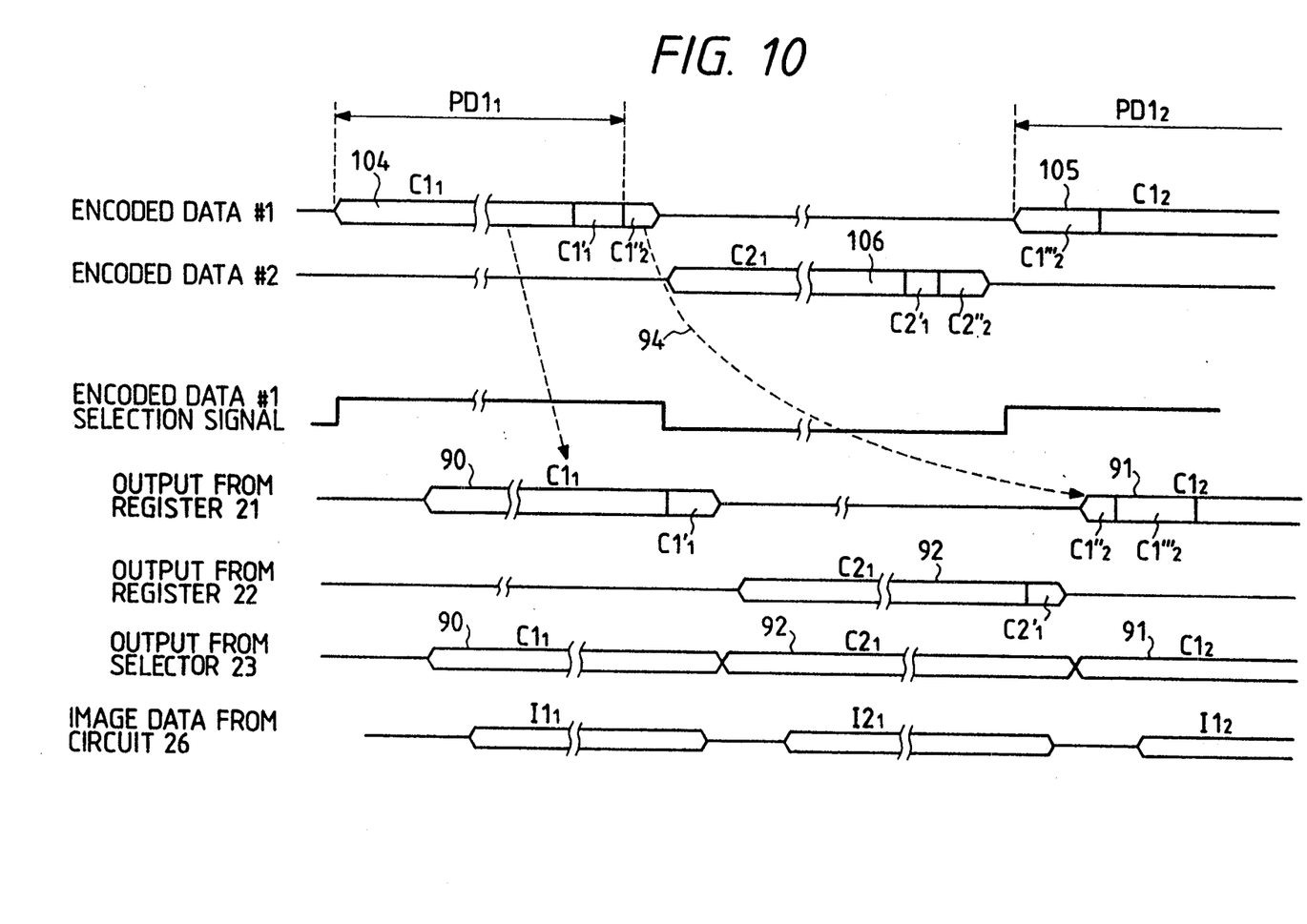
FIGS. 10 and 11 are timing diagrams for describing the operation of the decoder of FIG. 8.
Figure 11:
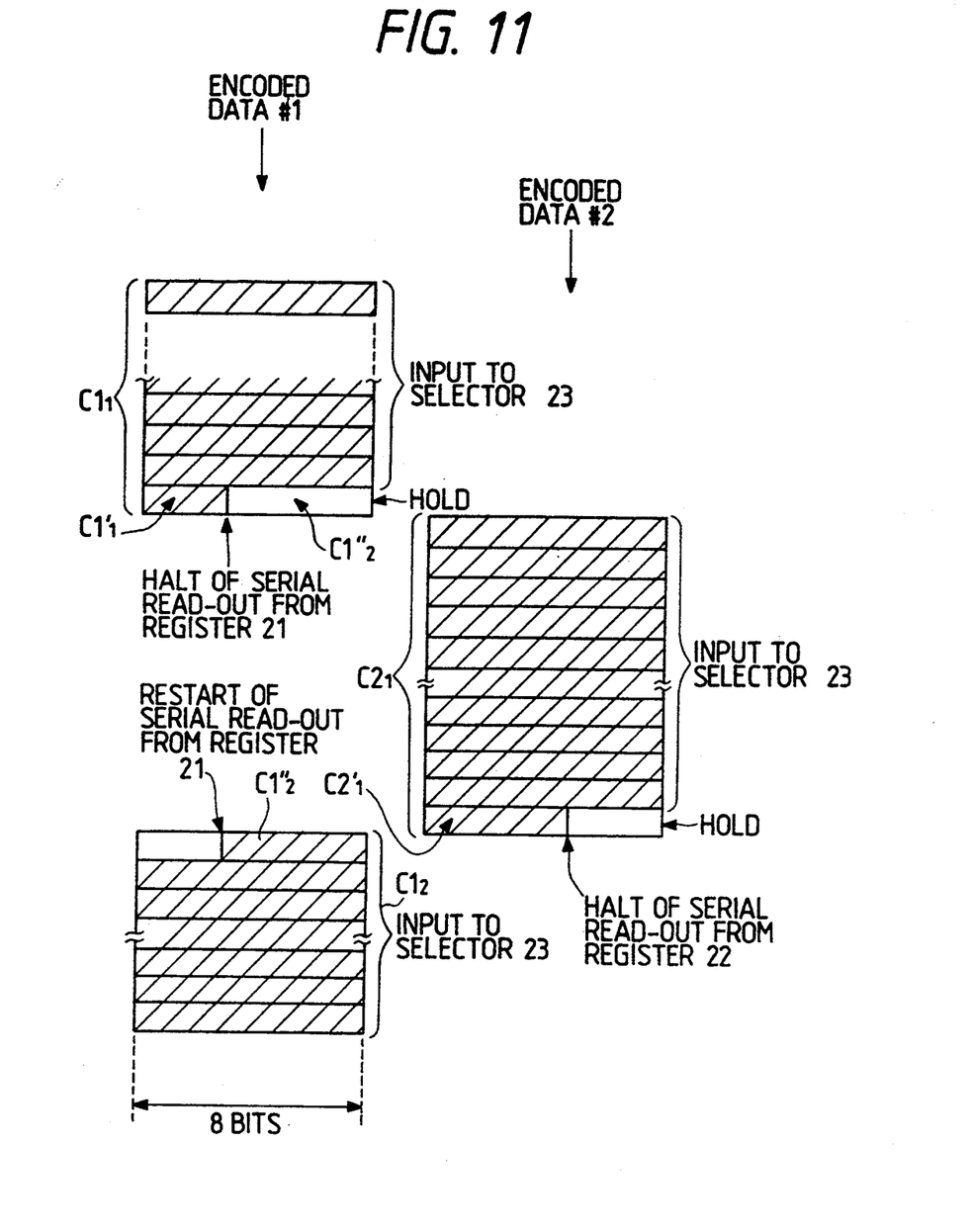

As illustrated in FIGS. 10 and 11, considering the first line portion 104 of encoded data #1 that is supplied to the encoded data #1 input register 21, successive bytes of encoded data #1 are read out from memory to be written into and serially read out from the encoded data #1 input register 21, until a final byte is written into register 21, which consists of the aforementioned portions $C1_1'$ and $C1_2''$. As described above, these constitute a final portion of the encoded data for the image data line $I1_1$ and an initial portion of the encoded data for the image data line $I1_2$, respectively. During serial read-out from the encoded data #1 input register 21, the system counts the successive bits which are read out, starting from the first bit of portion 104, and compares the cumulative count value with the position value $PD1_1$ which is being read out from the code position memory 27. When coincidence between the count value and that position value is detected, this indicates that the end point of that encoded data line portion has been reached (i.e. corresponding to the final bit of the original encoded data 90 for the first line, indicated in FIG. 6). In response to detecting that coincidence, the system sets the encoded data #1 selection signal to the "0" level thereby halting write-in and serial read-out from the encoded data #1 input register 21, and the remaining sub-portion $C1_2''$ is left stored in register 21.

With the encoded data #1 selection signal at the "0" level, the above process is repeated to write in successive bytes of the first portion 106 of the encoded data #2 to the input register 22, and serially read out the register contents while counting the bits read out, from the first bit of portion 106. Write-in and serial read-out of the register 22 are halted when the count value coincides with the position value $PD2_1$, and the encoded data #1 selection signal is then returned to the "1" level, i.e. at the end of the portion $C2_1'$, leaving the portion $C2_2''$ held in the code position memory 28. Hence the original encoded data portion 92 has been restored, and sent to be encoded, as illustrated in FIG. 10.

When the encoded data #1 selection signal returns to the "1" level, serial read-out from the encoded data #1 input register 21 is enabled to to restart, and so read out the remaining portion ($C1_2''$) which had been left held therein. Counting of successive bits read out from register 21 is also started from zero, from the first bit of that remaining portion. The next position value ($PD1_2$) is read out from the code position memory 27, and successive bytes of the code portion 105 for the second line of encoded data #1 are transferred from memory to be written into and serially read out from the encoded data #1 input register 21, with the total number of bits read out being counted and the count value compared with the current position value ($PD1_2$). When coincidence is detected, the write-in and read-out of the register 21 are halted As a result, the sub-portion $C1_2''$ becomes restored to the head of the succeeding portion of encoded data #1 as illustrated in FIG. 10, so that the original encoded data line portion 91 has been restored and supplied to be encoded.

It can thus be understood that the sets of encoded data designated as 90, 91, 92 in FIGS. 6 and 10 are restored to their original form by the operation of the decoder of FIG. 8, for each of respective lines, before being supplied to the table look-up circuit 24, although these encoded data portions had been modified by the encoder of FIG. 3 to be each formed of an integral number of 8-bit bytes for the purpose of storing in memory. As indicated by the arrow line 94 in FIG. 10 for example, the encoded data portion $C1_2''$ which had been combined with the portion $C1_1''$ in the encoded data portion 104 in order to make up an integral number of bytes, is transferred to its correct position at the head of the portion 91 of encoded data #1, prior to decoding processing by the table look-up circuit 24, mode judgement circuit 25 and image data restoration circuit 26.

It can be seen that cyclic repetition of the operation control sequence shown in FIG. 9 will achieve the results described above for the encoder embodiment.

It can thus be understood that with the above embodiment of an image data encoding/decoding apparatus according to the present invention formed of the encoder of FIG. 3 and the decoder of FIG. 8, two streams of respectively different image data can be encoded in parallel by using a single encoder section (formed of the transition point detection circuit 12, mode judgement circuit 13, table look-up circuit 14 in FIG. 3), and two streams of respectively different encoded data can be decoded to recover original image data by using a single decoder section (formed of the table look-up circuit 24, mode judgement circuit 25 and image data restoration circuit 26 in FIG. 8). The invention therefore provides a significant reduction in the hardware scale of an image data encoding/decoding apparatus in which such concurrent encoding and decoding processing must be executed, by comparison with the prior art in which two encoder sections and two decoder sections must be used.

Morever the output encoded data produced from the encoder are formed as standard integral data units such as bytes, and so can be directly transferred through a standard data bus to be stored in memory, and subsequently read out and transferred to the decoder via that bus.

The decoder of the above embodiment has been described for the case in which two different streams of encoded data are encoded concurrently, by being supplied as respectively alternating lines of data. With another decoder embodiment according to the present invention however, only one stream of encoded data is processed at a time, but priority is assigned to decoding one of the streams of encoded data when such encoding becomes necessary.

In that case, assuming for example that priority has been assigned to decoding the encoded data #2, and that the encoded data #1 is currently being decoded, then in that case the encoded data #1 stream would be continuously supplied to the input register 21 and the input selector 23 would be controlled such as to transfer the output encoded data from the register 21 to the look-up circuit 24. When it becomes necessary to process encoded data #2, then the transfer of the encoded data #1 stream to the input register 21 would be interrupted, and the stream of encoded data #2 data would be continuously supplied to the input register 22, while the input selector 23 would be controlled to transfer the output encoded data from register 22 to the look-up circuit 24. After decoding a specific amount of the encoded data #2, e.g. the encoded data for one page, the decoding of encoded data #1 would be resumed.

In that case, the successive lines of each data stream would be processed for decoding in the same way as has been described for the decoder embodiment described above.

Although the decoder has been described for ease of understanding in terms of separate circuit blocks performing respective functions, it will be understood that in a practical apparatus, all or most of the described functions of these blocks can be implemented by programed operation of a microcomputer which executes control operations as illustrated in the flow diagrams.

What is claimed is:

1. An image data encoding/decoding apparatus comprising:

first selector means for respectively selecting image data from different streams of input image data, said image data being selected in fixed amounts of image data lines;

detection means for detecting transition points in said image data selected by said first selector means;

encoding means for encoding said image data in accordance with transition points detected in said image data to derive encoded data for each of the different streams of input image data;

memory means for receiving said encoded data derived by said encoding means for each of the different streams of input image data, said memory means alternately storing and reading out encoded data of each of said different streams of input image data in amounts comprising a fixed number of bits;

a plurality of position storage means respectively corresponding to said streams of input image data, wherein each of said position storage means, when a final portion of a line of encoded data from a corresponding one of said different streams of input image data does not include said fixed number of bits, derives and stores a value representing a position of a final bit of said final portion within said memory means, and controls said memory means to store said final portion until encoding of a succeeding line of said corresponding input image data stream begins;

second selector means for selecting and outputting said encoded data from said memory means; and selector control means for controlling respective operations of said first and second selector means.

2. An apparatus according to claim 1, wherein said different streams of input image data respectively comprise image data which have been read by a scanner and are to be subsequently transmitted, and image data which have been previously encoded and stored in a memory.

3. An apparatus according to claim 1, wherein said selector control means controls said first selector means to successively select alternating lines of said different streams of input image data.

4. An apparatus according to claim 1, wherein said memory means comprise a plurality of memories, identical in number to a number of said different input image data streams, each of said memories functioning to temporarily store encoded data of a corresponding one of said different input image data streams.

5. An image data encoding/decoding apparatus comprising:
first selector means for respectively selecting image data from different streams of input image data;
detection means for detecting transition points in said image data selected by said first selector means;
encoding means for encoding said image data in accordance with transition points detected in said image data to derive encoded data for each of the different streams of input image data;
a plurality of memories respectively corresponding to said different streams of input image, each of said memories functioning to temporarily store encoded data derived by said encoding means from a corresponding one of said different input image data streams;
a plurality of .position storage means respectively corresponding to said different streams of input image data, wherein each of said position storage means, when a final portion of a line of encoded data derived from an input image data stream corresponding to said position storage means does not include a fixed predetermined amount of data, derives and stores a value representing a position of a final bit of said final portion within said corresponding memory, and controls said corresponding memory to store said final portion until encoding of a succeeding line of said corresponding input image data stream begins;
second selector means for selecting and outputting encoded data of said different input image data streams produced from said memories; and
selector control means for controlling operations of said first and second selector means to assign priority to encoding of a specific one of said different streams of input image data, by temporarily interrupting selection of another one of said different streams of input image data when encoding of said specific one of said different streams is required.

6. An apparatus according to claim 5, wherein said different streams of input image data respectively comprise image data which have been read by a scanner and are to be subsequently transmitted, and image data which have been previously encoded and stored in a memory.

7. An image data encoding/decoding apparatus comprising:
memory means for respectively receiving two different streams of encoded data, and for alternately storing and reading out the encoded data of the respective streams as fixed amounts of data, each of said fixed amounts comprising a fixed number of bits;
a pair of position storage means respectively corresponding to said streams of encoded data, wherein each of said position storage means stores respective positions of final bits of lines of a corresponding one of said streams of encoded data and controls said memory means to halt outputting of encoded data of said corresponding encoded data stream each time that a position corresponding to a final bit of a line of said corresponding encoded data stream is reached, and to subsequently resume outputting of encoded data stored therein at commencement of receiving encoded data of a succeeding line of said corresponding encoded data stream;
selector means for receiving said encoded data produced from said memory means, and for selecting encoded data of said respective streams;
decoding means for decoding the encoded data selected by said selector means; and
selector control means for controlling operation of said selector means.

8. An apparatus according to claim 7, wherein said different streams of encoded data respectively comprise encoded data to be transferred to a printer after decoding, and encoded data which have been read out from an encoded data memory and are to be changed to a different code format and then stored in an encoded data memory.

9. An apparatus according to claim 7, wherein said selector means functions to successively select alternating lines of said different streams of encoded data.

10. An apparatus according to claim 7, wherein said memory means comprise a plurality of memories, identical in number to a number of said encoded data streams.

11. An image data encoding/decoding apparatus comprising:
memory means for respectively receiving two different streams of encoded data, each of said streams comprising sequential lines of encoded data, and for alternately storing and reading out the encoded data of the respective streams as fixed amounts of data, each fixed amount comprising a fixed number of bits;
a plurality of position storage means respectively corresponding to said streams of encoded data, wherein each of said position storage means stores respective positions of final bits of lines of a corresponding one of said streams of encoded data and controls said memory means to halt reading out of encoded data of one of said encoded data streams corresponding to said each position storage means when a position corresponding to a final bit of a line of said encoded data stream is reached, and to subsequently resume reading out of encoded data of said encoded data stream at commencement of receiving encoded data of a succeeding line of said encoded data stream;
selector means for receiving encoded data produced from said memory means, and for selecting encoded data of said respective streams;
decoding means for decoding the encoded data selected by said selector means; and
control means for controlling said selector means to assign priority to a specific one of said different streams of encoded data, by temporarily interrupting selection of another one of said different streams of encoded data when decoding of said specific one of the different streams is required.

12. An apparatus according to claim 11, wherein said different streams of encoded data respectively comprise encoded data which have been received by said image data encoding/decoding apparatus and are to be transferred to a printer after decoding, and encoded data which have been read out from an encoded data memory and are to be changed to a different code format and to be then stored in an encoded data memory.

13. An image data encoding/decoding apparatus having an encoder and a decoder, wherein said encoder comprises:

first selector means for respectively selecting image data from different streams of input image data, each of said streams comprising sequential lines of input image data;

detection means for detecting transition points in said image data selected by said first selector means;

encoding means for encoding said image data in accordance with transition points detected in said image data to derive encoded data for each of the different streams of input image data;

first memory means for storing encoded data derived by said encoding means for each of the different streams of input image data, and means for controlling said first memory means to alternately store and read out encoded data of each of said different streams of input image data as fixed amounts of data, wherein each fixed amount comprises a fixed number of bits;

a first plurality of position storage means respectively corresponding to said streams of input image data, wherein each of said position storage means, when a final portion of a line of encoded data derived from one of said image data streams corresponding to said position storage means does not include said fixed amount of data, derives and stores a value representing a position of a final bit of said final portion within aid first memory means, and controls said first memory means to store said final portion until encoding of a succeeding line of said corresponding one of the input image data streams begins;

second selector means for selecting and outputting said encoded data from said first memory means; and first selector control means for controlling said first and second selector means;

and wherein said decoder comprises:

second memory means for respectively receiving different streams of encoded data, and for storing the encoded data of the respective streams, said second memory means operating on each of said encoded data streams to alternately store and read out said each encoded data stream as fixed amounts of data, wherein each fixed amount comprises a fixed number of bits;

a second plurality of position storage means respectively corresponding to said streams of encoded data, wherein each of said position storage means stores respective positions of final bits of lines of a corresponding one of said streams of encoded data and controls said second memory means to halt reading out of encoded data of said corresponding one of the encoded data streams each time that a position corresponding to a final bit of a line of said corresponding one of the encoded data streams is reached, and to subsequently resume reading out of encoded data of said corresponding one of the encoded data streams at commencement of receiving encoded data of a succeeding line of said corresponding one of the encoded data streams;

third selector means for receiving said encoded data amounts produced from said second memory means, and for selecting encoded data of said respective streams;

second selector control means for controlling operation of said third selector means; and decoding means for decoding the encoded data selected by aid third selector means.

14. An image data encoding/decoding apparatus comprising:

an encoder for concurrently converting first image data and second image data to first encoded data and second encoded data respectively, and a decoder for concurrently recovering said first image data and second image data from said first encoded data and second encoded data respectively, each of said first and second image data consisting of successive line portions occurring in respective line intervals, said line intervals of the first and second image data occurring in mutual alternation;

wherein said encoder comprises an encoding circuit, input selector means for sequentially inputting alternate ones of said line portions of said first image data and second image data to said encoding circuit, first and second encoded data output registers, first and second code position memories, output selector means for transferring to a common output said first encoded data and second encoded data read out from said first and second encoded data output registers, and control means functioning for each of said first image data line portions to:

write into said first encoded data output register, in successive data units each consisting of a fixed plurality of bits, a first encoded data line portion produced from said encoding circuit means in response to said each first image data line portion, while serially reading out encoded data from said first encoded data output register;

halt writing and reading of said first encoded data output register when a final bit of a line portion of said first encoded data corresponding to one of said image data lines has been read out, while leaving in said first encoded data output register a final sub-portion of said encoded data line portion, said sub-portion being shorter than said unit fixed size; and store in said first code position memory a position value indicating a position of said final bit in relation to an initial bit of said encoded data line portion; and wherein said control means functions for each of said second image data line portions to;

write into said second encoded data output register, in successive ones of said data units, a second encoded data line portion produced from said encoding circuit means in response to said each second image data line portion, while serially reading out encoded data from said second encoded data output register;

halt write-in and read-out from said second encoded data output register when a final bit of said second encoded data line portion corresponding to one of said image data lines has been read out while leaving in said second encoded data output register a sub-portion of said encoded data line portion, said sub-portion being shorter than said unit fixed size; and store in said second code position memory a position value indicating a position of said final bit in relation to an initial bit of said second encoded data portion.

15. An image data encoding/decoding apparatus according to claim 14, wherein said decoder comprises first and second encoded data input registers, third and fourth code position memories, decoding circuit means, encoded data input selector means for transferring encoded data read out from said first and second encoded data input registers to said decoding circuit means, for recovering said first image data and second image data, and control means functioning to initially set into said first and second code position memories said position values from said first and second code position memories respectively and to cyclically execute a procedure, starting from respective initial bits of said first encoded data and second encoded data and initial ones of said first position values and second position values, of:

reading out a current one of said position values from said third code position memory;

writing successive data units of said first encoded data into said first encoded data input register while serially reading out encoded data from said first encoded data input register and transferring said encoded data to said encoded data input selector means, while counting successive bits of said encoded data thus read out, to detect coincidence with said current position value;

when said coincidence is detected, halting writing and reading of said first encoded data input register, leaving held therein a sub-portion of said encoded data which is smaller than said data unit size;

reading out a current one of said position values from said fourth code position memory;

writing successive data units of said second encoded data into said second encoded data input register while serially reading out encoded data from said second encoded data input register and transferring said encoded data to said encoded data input selector means, while counting successive bits of said encoded data thus read out, to detect coincidence with said current position value; and when said coincidence is detected, halting writing and reading of said second encoded data input register, leaving held therein a sub-portion of said encoded data which is smaller than said data unit size.

* * * * *